United States Patent
Higashino

(12) 
(10) Patent No.: US 6,169,618 B1
(45) Date of Patent: Jan. 2, 2001

(54) DIGITAL AUTOMATIC POWER CONTROLLER FOR CONTROLLING OUTPUT LIGHT INTENSITY OF AN OPTICAL COMMUNICATION SYSTEM LIGHT SOURCE

(75) Inventor: Katsuhiko Higashino, Tokyo (JP)

(73) Assignee: NEC Corporation, Tokyo (JP)

(*) Notice: Under 35 U.S.C. 154(b), the term of this patent shall be extended for 0 days.

(21) Appl. No.: 08/829,826

(22) Filed: Mar. 25, 1997

(30) Foreign Application Priority Data

Mar. 28, 1996 (JP) .................................................. 8-074696

(51) Int. Cl.$^7$ ...................................................... H04B 10/04

(52) U.S. Cl. ............................. 359/187; 359/166; 372/38

(58) Field of Search .................................. 359/187, 194, 359/166; 372/38

(56) References Cited

U.S. PATENT DOCUMENTS 5,724,170 * 3/1998 Aizawa ................................ 359/187

* cited by examiner

Primary Examiner—Kinfe-Michael Negash
(74) Attorney, Agent, or Firm—Foley & Lardner

(57) ABSTRACT

A digital automatic power controller including a photo-diode for receiving input of a light signal output from a laser diode and converting the signal into a photoelectric conversion signal, a sample hold circuit for outputting a sample hold signal based on the photoelectric conversion signal, a comparator for comparing the signal level of the sample hold signal and a reference voltage to output a count control signal according to the comparison result, a counter circuit responsive to the count control signal for counting down or up a bit of a predetermined order to output an obtained count value, a digital-to-analog conversion circuit for converting the count value into an analog signal, and a light source drive control circuit for controlling the intensity of the output light of the laser diode by a driving current generated according to the level of the analog signal.

20 Claims, 4 Drawing Sheets

DIGITAL AUTOMATIC POWER CONTROLLER FOR CONTROLLING OUTPUT LIGHT INTENSITY OF AN OPTICAL COMMUNICATION SYSTEM LIGHT SOURCE

BACKGROUND OF THE INVENTION

1. Field of the Invention

The present invention relates to a digital automatic power controller for automatically controlling an output light intensity of an optical communication system light source and, more particularly, to a digital automatic power controller for efficiently controlling an output level through reduction of a pull-in time.

2. Description of the Related Art

Common optical communication systems for conducting data communication through transmission of light signals by means of optical fibers are provided with a digital automatic power controller (digital APC) for maintaining a constant output light intensity of a light source. In an optical communication system, it is a common practice to use a laser diode as the light source. A digital automatic power controller monitors an output light of the laser diode (the light source) by means of a photo-diode and feeds back the same to control the laser diode such that the output light maintains a constant light intensity.

FIG. 3 shows structure of a conventional digital automatic power controller. With reference to FIG. 3, a laser diode 180 functioning as a light source has an output light intensity of its light output signal (LO) controlled by a digital automatic power controller 100. The conventional digital automatic power controller 100 shown in FIG. 3 includes a photo-diode 110, an amplifier 120, a sample hold circuit 130, a comparator 140, a counter circuit 150, a D/A conversion circuit 160 and an LD (laser diode) drive control circuit 170.

The photo-diode 110 receives the light output signal (LO) of the laser diode 180 as a light input signal (LI) and photoelectrically converts the LI signal to output a photoelectric signal (IS). The amplifier 120 receives and amplifies the photoelectric signal (IS) output from the photo-diode 110 to supply an amplification signal (AS) to the sample hold circuit 130. The sample hold circuit 130 samples and holds the amplification signal (AS) output from the amplifier 120 to generate and supply a sample hold signal (SH) to the comparator 140. The comparator 140 compares the sample hold signal (SH) output from the sample hold circuit 130 with two reference voltages (R2) and (R3) to output count control signals (C2) and (C3) corresponding to the comparison results. The counter circuit 150 counts down or counts up in response to the count control signals (C2) and (C3) output from the comparator 140 to output a count value (N). The D/A conversion circuit 160 receives the count value (N) output from the counter circuit 150, converts the digital count value (N) into an analog signal (AN) and supplies the analog signal to the LD drive control circuit 170. The LD drive control circuit 170 generates an LD (laser diode) drive signal (DS) for driving the laser diode 180 in synchronization with a data signal (D) applied through a predetermined data input terminal, controls the level of the LD drive signal (DS) based on the analog signal (AN) output from the D/A conversion circuit 160, and supplies thus controlled DS to the laser diode 180.

Here, further detailed description will be made of operation of the comparator 140 and the counter 150.

Being supplied with two reference voltages (R2) and (R3) ((R2)>(R3)) which are set with a level of a sample hold signal (SH) corresponding to a desirable output light intensity of the laser diode 180 therebetween, the comparator 140 compares a level of an applied sample hold signal (SH) with the reference voltages (R2) and (R3). Then, the comparator sets levels of two count control signals (C2) and (C3) to be supplied to the counter circuit 150 according to the comparison results. More specifically, when the level of the sample hold signal (SH) is higher than the reference voltage (R2), for example, the comparator sets the count control signal (C2) to have a high level. In addition, when the level of the SH is lower than the reference voltage (R3), the comparator sets the count control signal (C3) to have a high level. In other words, when the sample hold signal (SH) level is higher than the reference voltage (R2), only the count control signal (C2) attains a high level, when the signal level is between the reference voltage (R2) and the reference voltage (R3), both the count control signals (C2) and (C3) attain a low level, and when the signal level is lower than the reference voltage (R3), only the count control signal (C3) attains a high level.

The counter circuit 150 counts a count value (N) down bit by bit when the count control signal (C2) is at a high level out of the count control signals (C2) and (C3) received from the comparator 140. When the count control signal (C3) is at a high level, the circuit 150 counts a count value (N) up bit by bit. When both the count control signals (C2) and (C3) are at a low level, the circuit conducts no counting operation.

An output light intensity of a light output signal (LO) of the laser diode 180 is thus controlled by an LD drive signal (DS) output from the LD drive circuit 170 of the digital automatic power controller 100. A level of a sample hold signal (SH) corresponding to the light output signal (LO) of the laser diode 180 is controlled to be constant between the reference voltages (R2) and (R3). As a result, the output light intensity of the light output signal (LO) of the laser diode 180 will be controlled to be within a predetermined range.

Operation of the conventional digital automatic power controller will be described taking, as an example, a case where an output light intensity of a light output signal is higher than a predetermined value. FIG. 4 is a time chart showing operation waveforms of the respective parts of the conventional digital automatic power controller 100 shown in FIG. 3. Illustrated in the figure are a data signal (D), a light output signal (LO) of the laser diode 180 synchronized with the data signal (D), a photoelectric signal (IS) based on the light output signal (LO), a sample hold signal (SH) of the photoelectric signal (IS) and a count control signal (C2). Broken lines R2 and R3 indicated at the photoelectric signal (IS) and the sample hold signal (SH) denote levels of the reference voltages (R2) and (R3), respectively.

It is shown in FIG. 4 that at an initial stage, the level of the sample hold signal (SH) is higher than the reference voltage (R2). The count control signal (C2) therefore attains a high level, so that the count value (N) of the counter circuit 150 is counted down. The LD drive circuit 170 responsively outputs an LD drive signal corresponding to the amount of the reduction of the count value (N) to decrease the output light intensity of the light output signal (LO) of the laser diode 180. Until the level of the sample hold signal (SH) lowers to have a voltage between the reference voltages (R2) and (R3), the count control signal (C2) will be further maintained at a high level, so that the counter circuit 150 will continue counting down the count value (N) to keep decreasing the output light intensity of the light output signal (LO) of the laser diode 180.

When the level of the sample hold signal (SH) reaches a value between the reference voltages (R2) and (R3), the count control signal (C2) attains a low level, so that the counter circuit 150 stops updating the count value (N). The LD drive circuit 170 responsively controls an LD drive signal to maintain a constant output light intensity of the light output signal (LO) of the laser diode 180.

Contrary to the above-described case, when the output light intensity of the light output signal (LO) is lower than a predetermined value corresponding to the reference voltage (R3), the count control signal (C3) attains a high level, so that the count value (N) of the counter circuit 150 is counted up. The LD drive circuit 170 responsively outputs an LD drive signal (DS) to increase the light output signal (LO).

The light output signal (LO) is thus controlled to have an output light intensity between a predetermined light intensity corresponding to the reference voltage (R2) and that corresponding to the reference voltage (R3).

The above-described conventional digital automatic power controller conducts pull-in control through feedback of a light output signal of a laser diode on a minimum bit basis. The controller therefore has a drawback that pull-in processing takes much time when the number of bits of a counter circuit is large. Assuming the number of bits of the counter circuit to be, for example, N bits (N: integer), a number of counts required for pull-in processing, at the maximum, that is, when every bit value changes from "0" to "1, is 2n–1 times.

SUMMARY OF THE INVENTION

An object of the present invention is to provide a digital automatic power controller capable of efficiently controlling a laser diode through elimination of the foregoing conventional shortcomings to reduce a pull-in time.

According to one aspect of the invention, a digital automatic power controller for feeding back information on an output light of a light source of an optical communication system to automatically control an output light intensity, comprises light signal input means for receiving and photoelectrically converting a light signal output from the light source to output a photoelectric conversion signal, sample hold means for sampling and holding a photoelectric conversion signal output from the light signal input means to output a sample hold signal, comparison means for comparing a signal level of a sample hold signal output from the sample hold means with four or more kinds of preset reference voltages to output a count control signal according to the comparison results, count means responsive to the count control signal output from the comparison means for counting down or up a bit of a predetermined order to decrease or increase a count value and outputting an obtained count value, digital-to-analog conversion means for converting the count value output from the count means into an analog signal, and light source drive control means for supplying, to the light source, a driving current of the light source generated according to the level of the analog signal to control the light intensity of the output light of the light source.

In the preferred construction, the comparison means on the basis of a predetermined target value of a signal level of the sample hold signal, sets two or more kinds of reference voltages whose levels are higher than the target value and two or more kinds of reference voltages whose levels are lower than the target value, and compares a signal level of the sample hold signal output from the sample hold means with the reference voltages and generates and supplies to the count means a count control signal having information which specifies a range of the signal level of the sample hold signal, and the count means, according to the range of the signal level of the sample hold signal indicated by the count control signal received from the comparison means, counts down or up a high-order bit when the difference between the signal level and the signal level target value is large and counts down or up the lowest-order bit when the difference between the signal level and the signal level target value is sufficiently small.

In the preferred construction, the comparison means, centered around a predetermined target value of the signal level of the sample hold signal, sets a total of four or more of the reference voltages whose levels are different from each other, in which reference voltages whose levels are higher than the target value and reference voltages whose levels are lower than the target value are the same in number, and compares the signal level of the sample hold signal output from the sample hold means with the reference voltages and generates and supplies to the count means a count control signal having information which specifies the range of the signal level of the sample hold signal, and the count means, according to the range of the signal level of the sample hold signal indicated by the count control signal received from the comparison means, counts down or up a high-order bit when the difference between the signal level and the signal level target value is large and counts down or up the lowest-order bit when the difference between the signal level and the signal level target value is sufficiently small.

In another preferred construction, the comparison means, on the basis of a predetermined target value of the signal level of the sample hold signal, sets two or more kinds of reference voltages whose levels are higher than the target value and two or more kinds of reference voltages whose levels are lower than the target value, generates the count control signal correlated with each of the reference voltages, and sets the count control signal so as to indicate whether its corresponding reference voltage is higher or lower than the signal level of the sample hold signal output from the sample hold means and supplies the set count control signal to the count means, and the count means, when the signal level of the sample hold signal output from the sample hold means is higher than the target value, counts down a bit of a predetermined order correlated in advance with the count control signal corresponding to the reference voltage of the highest level among the reference voltages that are lower than the signal level, and when the signal level of the sample hold signal output from the sample hold means is lower than the target value, counts up a bit of a predetermined order correlated in advance with the count control signal corresponding to the reference voltage of the lowest level among the reference voltages that are higher than the signal level.

In another preferred construction, the comparison means, centered around a predetermined target value of the signal level of the sample hold signal, sets a total of four or more of the reference voltages whose levels are different from each other, in which reference voltages whose levels are higher than the target value and reference voltages whose levels are lower than the target value are the same in number, generates a count control signal correlated with each of the reference voltages, and sets the count control signal so as to indicate whether its corresponding reference voltage is higher or lower than the signal level of the sample hold signal output from the sample hold means and supplies the set count control signal to the count means, and the count means, when the signal level of the sample hold signal output from the sample hold means is higher than the target value, counts down a bit of a predetermined order correlated in advance with the count control signal corresponding to the reference voltage of the highest level among the reference voltages that are lower than the signal level, and when the signal level of the sample hold signal output from the sample hold means is lower than the target value, counts up a bit of a predetermined order correlated in advance with the count control signal corresponding to the reference voltage of the lowest level among the reference voltages that are higher than the signal level.

In the above-mentioned construction, the comparison means, on the basis of a predetermined target value of a signal level of the sample hold signal, sets two or more kinds of reference voltages whose levels are higher than the target value and two or more kinds of reference voltages whose levels are lower than the target value, generates the count control signal correlated with each of the reference voltages, sets the count control signal correlated with the reference voltage whose level is higher than the target value to a high level or a low level when the signal level of the sample hold signal output from the sample hold means is higher or lower than its corresponding reference voltage, respectively, and sets the count control signal correlated with the reference voltage whose level is lower than the target value to a high level or a low level and supplies the set count control signal to the count means when the signal level of the sample hold signal output from the sample hold means is lower or higher than its corresponding reference voltage, respectively, and the comparison means, when there exists, among the count control signals received from the comparison means, the count control signal which is correlated with the reference voltage whose level is higher than the target value and is set to a high level, counts down a bit of a predetermined order correlated in advance with the count control signal, and when there exists, among the count control signals received from the comparison means, the count control signal which is correlated with the reference voltage whose level is lower than the target value and is set to a high level, counts up a bit of a predetermined order correlated in advance with the count control signal.

Also, the comparison means, centered around a predetermined target value of the signal level of the sample hold signal, sets a total of four or more of the reference voltages whose levels are different from each other, in which reference voltages whose levels are higher than the target value and reference voltages whose levels are lower than the target value are the same in number, generates the count control signal correlated with each of the reference voltages, sets the count control signal correlated with the reference voltage whose level is higher than the target value to a high level or a low level when the signal level of the sample hold signal output from the sample hold means is higher or lower than its corresponding reference voltage, respectively, and sets the count control signal correlated with the reference voltage whose level is lower than the target value to a high level or a low level and supplies the set count control signal to the count means when the signal level of the sample hold signal output from the sample hold means is lower or higher than its corresponding reference voltage, respectively, and the comparison means, when there exists, among the count control signals received from the comparison means, the count control signal which is correlated with the reference voltage whose level is higher than the target value and is set to a high level, counts down a bit of a predetermined order correlated in advance with the count control signal, and when there exists, among the-count control signals received from the comparison means, the count control signal which is correlated with the reference voltage whose level is lower than the target value and is set to a high level, counts up a bit of a predetermined order correlated in advance with the count control signal.

According to another aspect of the invention, a digital automatic power controller for feeding back information on an output light of a light source of an optical communication system to automatically control an output light intensity, comprises light signal input means for receiving and photoelectrically converting a light signal output from the light source to output a photoelectric conversion signal, sample hold means for sampling and holding the photoelectric conversion signal output from the light signal input means to output a sample hold signal, comparison means for comparing a signal level of the sample hold signal output from the sample hold means with four or more kinds of preset reference voltages to output a count control signal according to a range of the signal level of the sample hold signal obtained as a result of the comparison, count means responsive to the count control signal output from the comparison means for counting down or up a bit of a predetermined order to decrease or increase a count value and outputting an obtained count value, digital-to-analog conversion means for converting the count value output from the count means into an analog signal, and light source drive control means for supplying, to the light source, a driving current of the light source generated according to the level of the analog signal to control the light intensity of the output light of the light source.

In the above-mentioned construction, centered around a predetermined target value of a signal level of the sample hold signal, the reference voltages to be compared with a signal level of the sample hold signal at the comparison means are set to be two kinds whose levels are higher than the target value and two kinds whose levels are lower than the target value, the comparison means generates four count control signals each correlated with each of the four kinds of reference voltages, and sets the count control signal so as to indicate whether its corresponding reference voltage is higher or lower than the signal level of the sample hold signal output from the sample hold means and supplies the set count control signal to the count means, and the count means, when the count control signal correlated with the reference voltage of the highest level indicates that the signal level of the sample hold signal is higher than the reference voltage, counts down the second-lowest-order bit by one to reduce the count value by "2", when the count control signal correlated with the reference voltage of the highest level indicates that the signal level of the sample hold signal is lower than the reference voltage and the count control signal correlated with the reference voltage of the second highest level indicates that the signal level of the sample hold signal is higher than the reference voltage, counts down the lowest-order bit by one to decrease the count value by "1", when the count control signal correlated with the reference voltage of the lowest level indicates that the signal level of the sample hold signal is lower than the reference voltage, counts up the second-lowest-order bit by one to increase the count value by "2", and when the count control signal correlated with the reference voltage of the lowest level indicates that the signal level of the sample hold signal is higher than the reference voltage and the count control signal correlated with the reference voltage of the second lowest level indicates that the signal level of the sample hold signal is lower than the reference voltage, counts up the lowest-order bit by one to increase the count value by "1".

In another preferred construction, centered around a predetermined target value of the signal level of the sample hold signal, the reference voltages to be compared with a signal level of the sample hold signal at the comparison means are set to be two kinds whose levels are higher than the target value and two kinds whose levels are lower than the target value the comparison means generates four count control signals each correlated with each of the four kinds of reference voltages, sets two of the count control signals correlated with two reference voltages whose levels are higher than the target value to a high level or a low level when a signal level of the sample hold signal output from the sample hold means is higher or lower than its corresponding reference voltage, respectively, and sets two of the count control signals correlated with two reference voltages whose levels are lower than the target value to a high level or a low level when a signal level of the sample hold signal output from the sample hold means is lower or higher than its corresponding reference voltage, respectively, and the count means, when the count control signal correlated with the reference voltage of the highest level is at a high level, counts down the second-lowest-order bit by one to decrease the count value by "2", when the count control signal correlated with the reference voltage of the highest level is at a low level and the count control signal correlated with the reference voltage of the second highest level is at a high level, counts down the lowest-order bit by one to decrease the count value by "1", when the count control signal correlated with the reference voltage of the lowest level is at a high level, counts up the second-lowest-order bit by one to increase the count value by "2", and when the count control signal correlated with the reference voltage of the lowest level is at a low level and the count control signal correlated with the reference voltage of the second lowest level is at a high level, counts up the lowest order bit by one to increase the count value by "1".

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessarily obscure the present invention.

Figure 1:
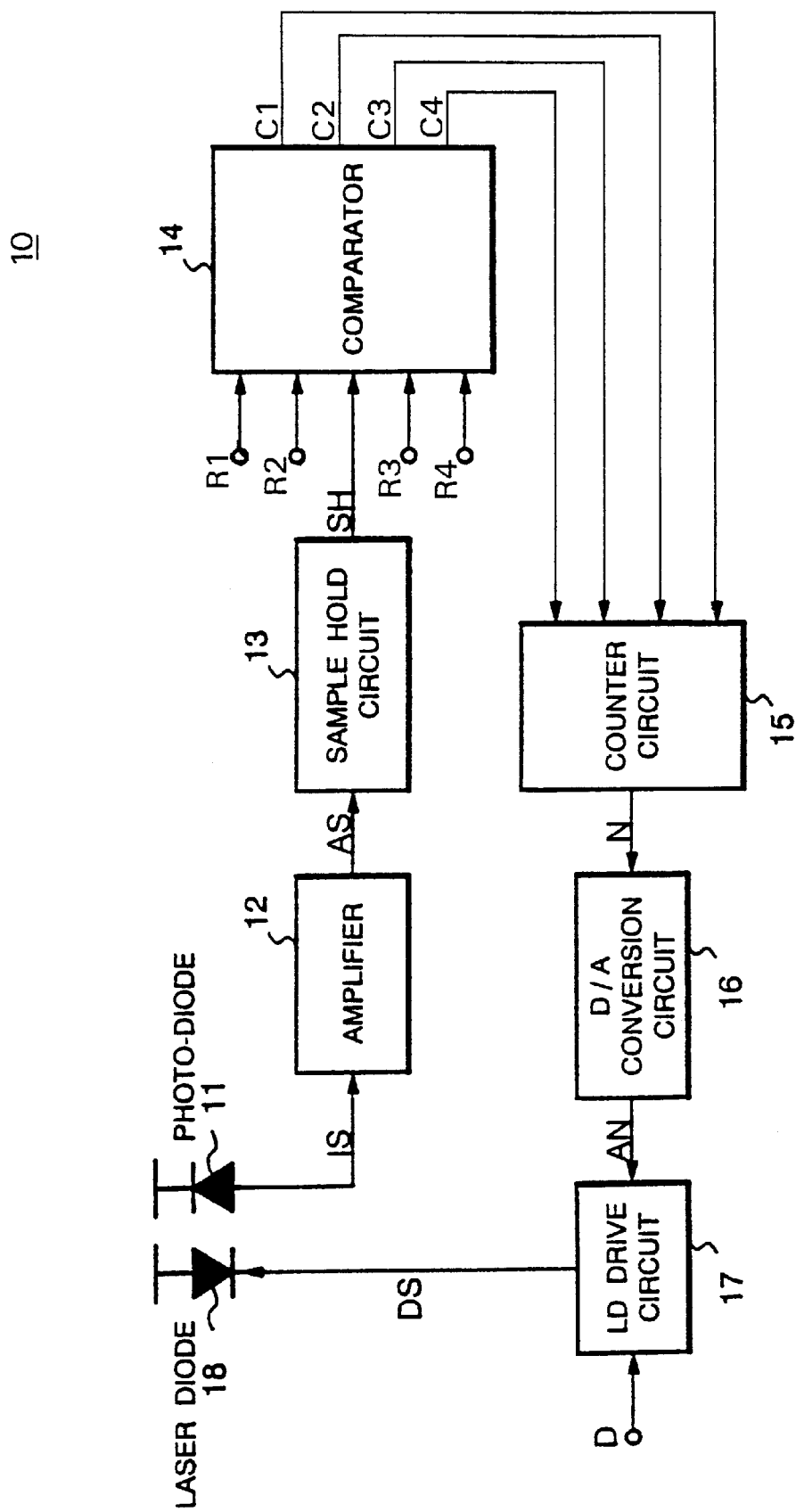
FIG. 1 is a block diagram showing structure of a digital automatic power controller according to one embodiment of the present invention.

FIG. 1 is a block diagram showing structure of a digital automatic power controller according to one embodiment of the present invention. As illustrated in FIG. 1, a digital automatic power controller 10 of the present embodiment includes a photo-diode 11, an amplifier 12, a sample hold circuit 13, a comparator 14, a counter circuit 15, a D/A conversion circuit and an LD (laser diode) drive control circuit 17. A laser diode 18 as a light source has an output light intensity of its light output signal (LO) controlled by the LD drive control circuit 17 of the digital automatic power controller 10. In FIG. 1, illustration is made only of a characteristic part of the structure of the present embodiment and that of the remaining common part is omitted.

The photo-diode 11 receives input of the light output signal (LO) of the laser diode 18 as a light input signal (LI) and photoelectrically converts the (LI) signal to output a photoelectric signal (IS). The amplifier 12 receives and amplifies the photoelectric signal (IS) output from the photo-diode 11 to supply an amplification signal (AS) to the sample hold circuit 13. The sample hold circuit 13 samples and holds the amplification signal (AS) output from the amplifier 12 to generate and supply a sample hold signal (SH) to the comparator 14.

Being supplied with an even number of, not less than four, reference voltages with different values, the comparator 14 compares the sample hold signal (SH) output from the sample hold circuit 13 with the respective reference voltages to output count control signals corresponding to comparison results. Centered around the value of the sample hold signal (SH) corresponding to a desired output light intensity of the laser diode 18, that is, around a target value to be converged on through control according to the present embodiment, and prepared as the reference voltages in general are the same number of voltages whose levels are higher than the target value and voltages whose levels are lower than the target value. In other words, for supplying M kinds of reference voltages, a number M/2 of reference voltages whose levels are higher than the target value are set and a number M/2 of reference voltages whose levels are lower than the target value are set. In this embodiment, four reference voltages (R1), (R2), (R3) and (R4) ((R1) >(R2)> (R3)>(R4)) are supplied, which are set such that a target value of the level of the sample hold signal (SH) falls between the reference voltages (R2) and (R3).

In addition, the comparator 14 of the present embodiment sets levels of four count control signals (C1), (C2), (C3) and (C4) according to the results of comparison between a sample hold signal (SH) corresponding to a light input signal (IS) detected by the photo-diode 11 and the four reference voltages (R1), (R2), (R3) and (R4) and outputs the four count control signals.

More specifically, for example, when the level of the sample hold signal (SH) is higher than the reference voltage (R1), the highest voltage, the comparator sets the count control signals (C1) and (C2) to have a high level. When the sample hold signal (SH) level is lower than the reference voltage (R4), the lowest voltage, the comparator sets the count control signals (C3) and (C4) to have a high level. When the sample hold signal (SH) level falls between the reference signal (R1) and the reference signal (R2), the comparator sets the count control signal (C2) to have a high level. When the sample hold signal level is between the reference signal (R3) and the reference signal (R4), the comparator sets the count control signal (C3) to have a high level. In other words, when the level of the sample hold signal (SH) is higher than the reference voltage (R1), the two count control signals (C1) and (C2) attain a high level and the remaining count control signals (C3) and (C4) attain a low level. When the sample hold signal (SH) level has a value between the reference signal (R1) and the reference signal (R2), only the count control signal (C2) attains a high level and the remaining count control signals (C1), (C3) and (C4) attain a low level. When the sample hold signal (SH) level has a value between the reference voltage (R2) and the reference voltage (M), all the count control signals (Cl), (C2), (C3) and (C4) attain a low level. When the sample hold signal (SH) level has a value between the reference signal (R3) and the reference signal (R4), only the count control signal (C3) attains a high level and the remaining count control signals (C1), (C2) and (C4) attain a low level. When the sample hold signal (SH) level is lower than the reference voltage (R4), the two count control signals (C3) and (C4) attain a high level and the remaining count control signals (C1) and (C2) attain a low level.

The counter circuit 15 counts down the second-lowest-order bit of the count value (N) bit by bit when the two count control signals (C1) and (C2) are at a high level out of the count control signals (C1), (C2), (C3) and (C4) received from the comparator 14. If only the count control signal (C2) is at a high level, the counter circuit counts down only the lowest-order bit of the count value (N) bit by bit. When only the count control signal (C3) is at a high level, the counter circuit counts up only the lowest-order bit of the count value (N) bit by bit. When the two count control signals (C3) and (C4) are at a high level, the counter circuit counts up the second-lowest-order bit of the count value (N) bit by bit. In other words, when the two count control signals (C1) and (C2) are at a high level, the count value (N) is counted down by "2" and when the two count control signals (C3) and (C4) are at a high level, the count value (N) is counted up by "2". When only the count control signal (C2) is at a high level, the count value (N) is conventionally counted down by "1", and when only the count control signal (C3) is at a high level, the count value (N) is conventionally counted up by "1". When all of the count control signals (Cl), (C2), (C3) and (C4) are at a low level, no counting operation is conducted.

The foregoing operation of the comparator 14 and the counter circuit 15 is an example of operation to be conducted when four kinds of reference voltages are supplied to the comparator 14 and four count control signals are set and therefore the operation may be suitably modified according to the number of reference voltages and count control signals. In addition, the relationship between a level of a count control signal and count-up or count-down of a count value (N) at the counter circuit 15 may be arbitrarily defined to obtain an optimum count value (N).

Next, the D/A conversion circuit 16 of the present embodiment receives the count value (N) output from the counter circuit 15, converts the digital count value (N) into an analog signal (AN) and supplies the analog signal to the LD drive control circuit 17. The LD drive control circuit 17 generates an LD (laser diode) drive signal (DS) for driving the laser diode 18 in synchronization with the data signal (D) applied through a predetermined data input terminal, controls the level of the LD drive signal (DS) based on the analog signal (AN) output from the D/A conversion circuit 16, and supplies thus controlled LD drive signal to the laser diode 18.

The output light intensity of the light output signal (LO) of the laser diode 18 is thus controlled by the LD drive signal (DS) output from the LD drive circuit 17 of the digital automatic power controller 10. The level of the sample hold signal (SH) corresponding to the light output signal (LO) of the laser diode 18 is then controlled to be constant between the reference voltages (R2) and (R3). As a result, the output light intensity of the light output signal (LO) of the laser diode 18 will constantly take a fixed value.

Operation of a conventional digital automatic power controller will be next described taking, as an example, a case where an output light intensity of a light output signal is higher than a predetermined value.

Figure 2:
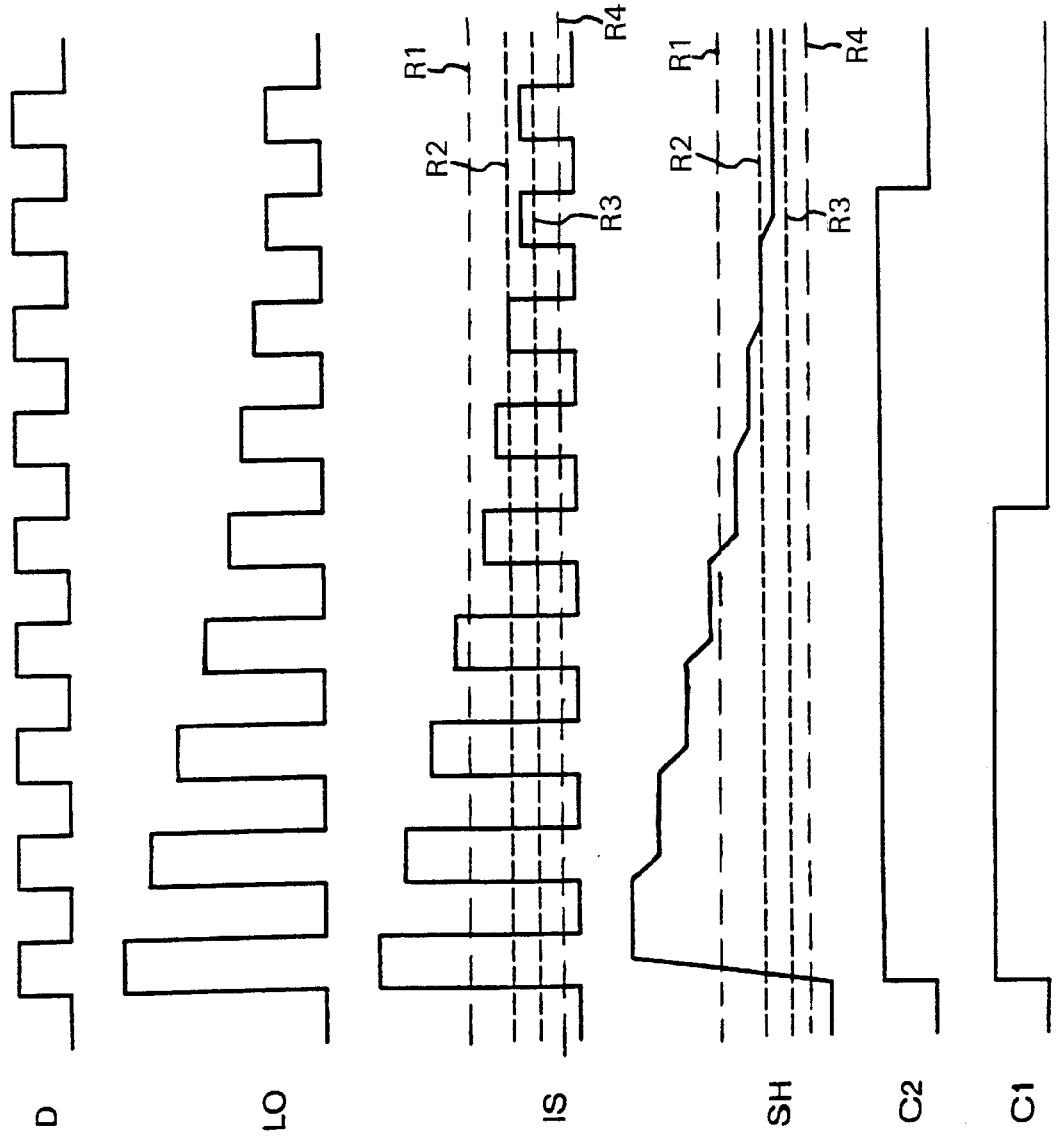
FIG. 2 is a time chart showing operation of the present embodiment.
Figure 3:
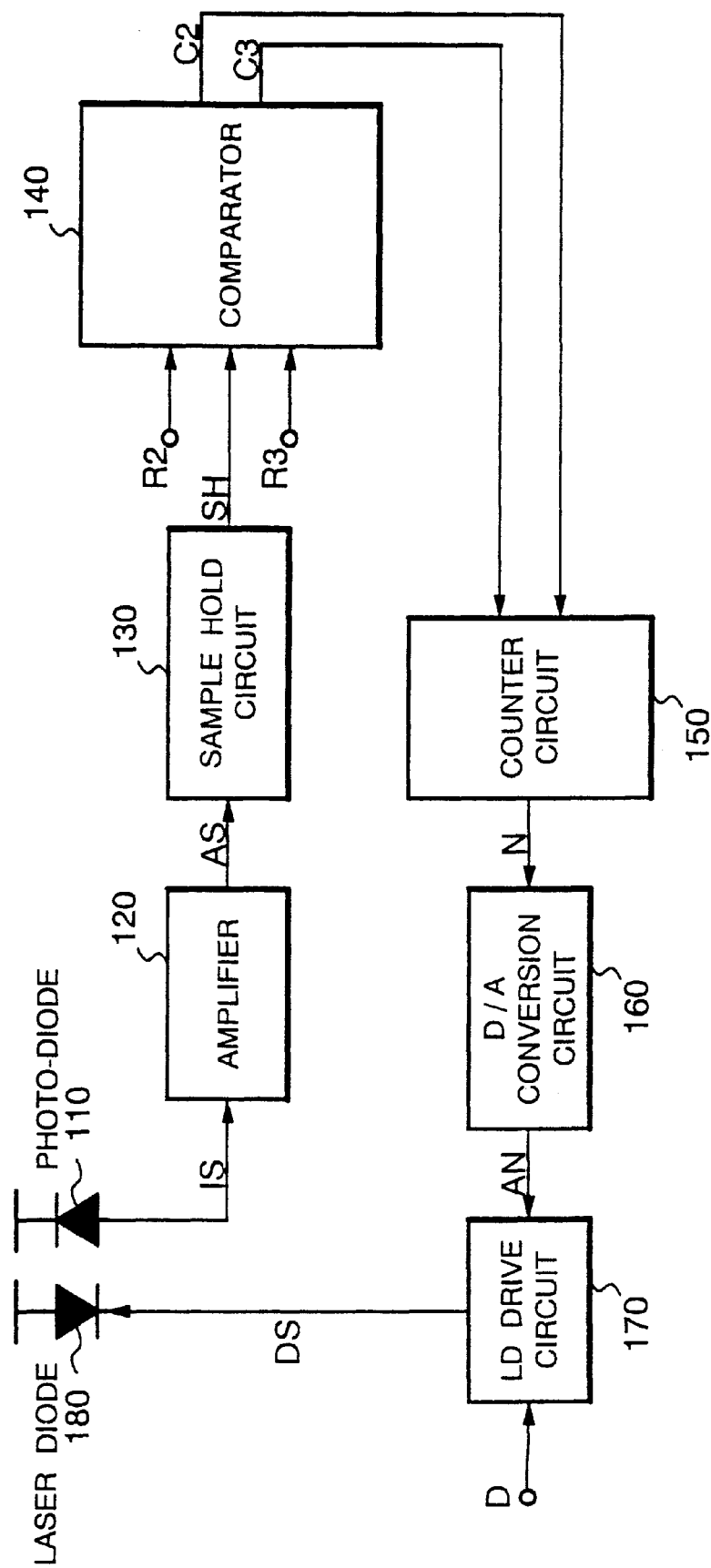
FIG. 3 is a block diagram showing structure of a conventional digital automatic power controller.
Figure 4:
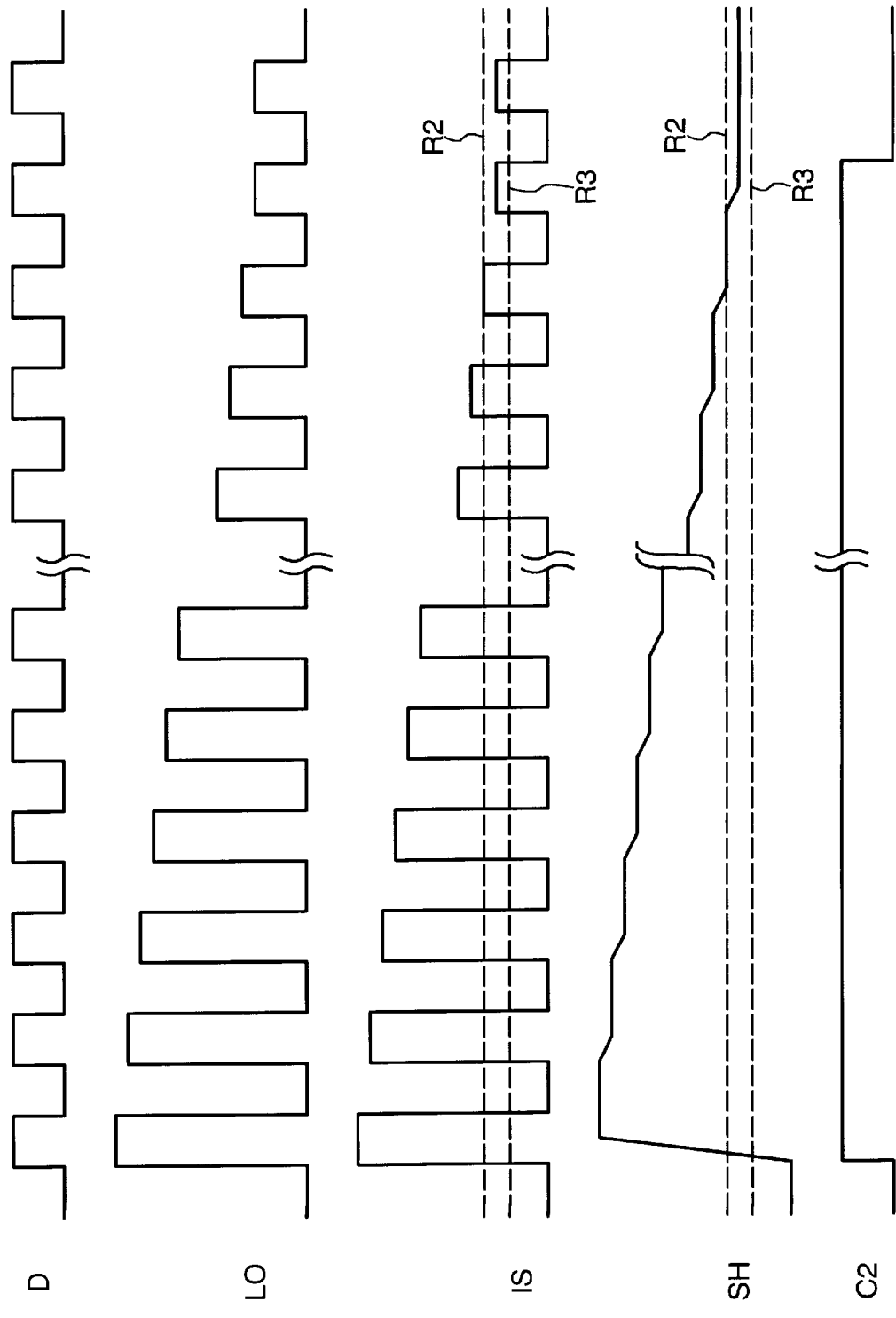
FIG. 4 is a time chart showing operation of the conventional digital automatic power controller.

FIG. 2 is a time chart showing operation waveforms of the respective parts of the digital automatic power controller 10 according to the present embodiment. Illustrated in the figure are a data signal (D), a light output signal (LO) of the laser diode 18 synchronized with the data signal (D), a photoelectric signal (IS) based on the light output signal (LO), a sample hold signal (SH) of the photoelectric signal (IS), and count control signals (C1) and (C2). Broken lines R1, R2, R3 and R4 indicated at the photoelectric signal (IS) and the sample hold signal (SH) denote levels of the reference voltages (R1), (R2), (R3) and (R4), respectively.

It is shown in FIG. 2 that at an initial stage, the level of the sample hold signal (SH) is higher than the reference voltage (R1). The count control signals (Cl) and (C2) output from the comparator 14 therefore attain a high level, so that the count value (N) of the counter circuit 15 is counted down by "2". As a result, the LD drive circuit 17 outputs an LD drive signal corresponding to the amount of the reduction of the count value (N) to decrease the output light intensity of the light output signal (LO) of the laser diode 18. Until the sample hold signal (SH) level lowers to be below the reference voltage (R1), the count control signals (C1) and (C2) will be further maintained at a high level, so that the counter circuit 15 will continue counting down the count value (N), by "2" to reduce the same, thereby keeping decreasing the output light intensity of the light output signal (LO) of the laser diode 18.

At timing (T1), the level of the sample hold signal (SH) lowers to be below the reference voltage (R1) and have a value between the reference voltage (R1) and the reference voltage (R2). Then, the count control signal (Cl) output from the comparator 14 attains a high level, so that the count value (N) of the counter circuit 15 is counted down only by "1". The LD drive circuit 17 responsively outputs an LD drive signal corresponding to the amount of the reduction of the count value (N) to decrease the output light intensity of the light output signal (LO) of the laser diode 18.

At timing (T2), the level of the sample hold signal (SH) further lowers to be below the reference voltage (R2) and have a value between the reference voltage (R2) and the reference voltage (R3). All of the count control signals (Cl), (C2), (C3) and (C4) then attain a low level, so that the counter circuit 15 stops updating the count value (N). The LD drive circuit 17 responsively controls the LD drive signal to maintain a fixed output light intensity of the light output signal (LO) of the laser diode 18.

Contrary to the above-described case, when the output light intensity of the light output signal (LO) is lower than predetermined values corresponding to the reference voltages (R3) and (R4), the count value (N) of the counter circuit 15 is suitably counted up. The LD drive circuit 17 responsively outputs an LD drive signal (DS) to increase the light output signal (LO).

The output light intensity of the light output signal (LO) is thus controlled to fall between a predetermined light intensity corresponding to the reference voltage (R2) and that corresponding to the reference voltage (R3).

As described in the foregoing, in the control processing of the laser diode 18 by the digital automatic power controller 10 according to the present embodiment, when the light output signal (LO) light intensity is high enough and the level of the sample hold signal (SH) corresponding to the light input signal (IS) is accordingly higher than the reference voltage (R1), the counter circuit 15 counts down the second-lowest-order bit to reduce the count value (N) by "2", so that the output light intensity of the light output signal (LO) rapidly decreases. On the contrary, when the light output signal (LO) light intensity is low enough and the level of the sample hold signal (SH) corresponding to the light input signal (IS) is lower than the reference voltage (R4), the counter circuit 15 counts up the second-lowest-order bit to increase the count value (N) by "2", so that the output light intensity of the light output signal (LO) rapidly increases.

Paying attention to the number of counts of the counter circuit 15 and assuming the number of bits of the counter circuit 15 to be N bits, a number of counts required for a pull-in operation, at the maximum, that is, in a case where values of all the bits change from "0" to "1", will be 2n−1 times. Therefore, as compared with a conventional case where the count value (N) of the counter circuit 15 is counted up or down by "1", a required number of counts is drastically reduced to shorten a pull-in time.

While in the present embodiment, four kinds of reference voltages are set for the supply to the comparator 14, it is also possible to supply more reference voltages and set more count control signals to further reduce a pull-in time. As described in the foregoing, it is desirable, in terms of controlling a light output signal (LO) of the laser diode 18, that a plurality of kinds of reference voltages are supplied, of which voltages whose levels are higher than a target value of a sample hold signal (SH) level and voltages whose levels are lower than the target value are set to be the same in number. Consideration will be here given to a case where in general M kinds of reference voltages are supplied to the comparator 14, of which a number M/2 of reference voltages are set to have levels higher than a target value of the sample hold signal (SH) level and a number M/2 of reference voltages are set to have levels lower than the target value. Assuming that the number of bits of the counter circuit 15 is N, a number of counts required for pull-in operation, at the maximum, that is, when values of all the bits change from "0" to "1", will be 2 (N−(M/2−1))+(M/2−1) times.

As described in the foregoing, in the digital automatic power controller of the present invention, the comparison circuit is supplied with more than conventional reference voltages to set and output count control signals as many as the number of the reference voltages based on comparison results between the reference voltages and a sample hold signal, and the counter circuit counts down or up a high-order bit as necessary based on the count control signals received from the comparison circuit, thereby rapidly decreasing or increasing a count value. As a result, the output light intensity of a light output signal of a laser diode can be rapidly decreased or increased. It is therefore possible to drastically reduce a pull-in time to efficiently control the laser diode.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A digital automatic power controller for feeding back information on an output light of a light source of an optical communication system to automatically control an intensity of the output light comprising:

light signal input means for receiving and photoelectrically converting a light signal output from said light source to output a photoelectric conversion signal;

sample hold means for sampling and holding the photoelectric conversion signal output from said light signal input means to output a sample hold signal;

comparison means for comparing a signal level of the sample hold signal output from said sample hold means with four or more kinds of preset reference voltages to output a count control signal according to comparison results;

count means responsive to the count control signal output from said comparison means for counting down or up a bit of a predetermined order to decrease or increase a count value and outputting an obtained count value;

digital-to-analog conversion means for converting the count value output from said count means into an analog signal; and light source drive control means for supplying, to said light source, a driving current of said light source generated according to the level of said analog signal to control the intensity of the output light of said light source.

2. The digital automatic power controller as set forth in claim 1, wherein said comparison means, on the basis of a predetermined target value of the signal level of said sample hold signal, sets two or more kinds of reference voltages whose levels are higher than the target value and two or more kinds of reference voltages whose levels are lower than the target value, and compares the signal level of said sample hold signal output from said sample hold means with said reference voltages and generates and supplies to said count means the count control signal having information which specifies a range of the signal level of the sample hold signal, and wherein said count means, according to the range of the signal level of said sample hold signal indicated by the count control signal received from said comparison means, counts down or up a high-order bit when the difference between the signal level and said signal level target value is larger than a predetermined value and counts down or up the lowest-order bit when the difference between the signal level and said signal level target value is smaller than the predetermined value.

3. The digital automatic power controller as set forth in claim 1, wherein said comparison means, centered around a predetermined target value of the signal level of said sample hold signal, sets a total of four or more of said reference voltages whose levels are different from each other, in which reference voltages whose levels are higher than the target value and reference voltages whose levels are lower than the target value are the same in number, and compares the signal level of said sample hold signal output from said sample hold means with said reference voltages and generates and supplies to said count means the count control signal having information which specifies a range of the signal level of the sample hold signal, and wherein said count means, according to the range of the signal level of said sample hold signal indicated by the count control signal received from said comparison means, counts down or up a high-order bit when the difference between the signal level and said signal level target value is larger than a predetermined value and counts down or up the lowest-order bit when the difference between the signal level and said signal level target value is smaller than the predetermined value.

4. The digital automatic power controller as set forth in claim 1, wherein said comparison means, on the basis of a predetermined target value of the signal level of said sample hold signal, sets two or more kinds of reference voltages whose levels are higher than the target value and two or more kinds of reference voltages whose levels are lower than the target value, generates the count control signal correlated with each of said reference voltages, and sets said count control signal so as to indicate whether its corresponding reference voltage is higher or lower than the signal level of said sample hold signal output from said sample hold means and supplies said set count control signal to said count means, and wherein said count means, when the signal level of said sample hold signal output from said sample hold means is higher than said target value, counts down a bit of a predetermined order correlated in advance with said count control signal corresponding to the reference voltage of the highest level among said reference voltages lower than said signal level, and, when the signal level of said sample hold signal output from said sample hold means is lower than said target value, counts up a bit of a predetermined order correlated in advance with said count control signal corresponding to the reference voltage of the lower level among said reference voltages higher than said signal level.

5. The digital automatic power controller as set forth in claim 1, wherein said comparison means, around a predetermined target value of the signal level of said sample hold signal, sets a total of four or more of said reference voltages whose levels are different from each other, in which reference voltages whose levels are higher than the target value and reference voltages whose levels are lower than the target value are the same in number, generates the count control signal correlated with each of said reference voltages, and sets said count control signal so as to indicate whether its corresponding reference voltage is higher or lower than the signal level of said sample hold signal output from said sample hold means and supplies said set count control signal to said count means, and wherein said count means, when the signal level of said sample hold signal output from said sample hold means is higher than said target value, counts down a bit of a predetermined order correlated in advance with said count control signal corresponding to the reference voltage of the highest level among said reference voltages lower than said signal level, and, when the signal level of said sample hold signal output from said sample hold means is lower than said target value, counts up a bit of a predetermined order correlated in advance with said count control signal corresponding to the reference voltage of the lowest level among said reference voltages higher than said signal level.

6. The digital automatic power controller as set forth in claim 1, wherein said comparison means, on the basis of a predetermined target value of the signal level of said sample hold signal, sets two or more kinds of reference voltages whose levels are higher than the target value and two or more kinds of reference voltages whose levels are lower than the target value, generates the count control signal correlated with each of said reference voltages, sets said count control signal correlated with the reference voltage whose level is higher than said target value to a high or low level when the signal level of said sample hold signal output from said sample hold means is higher or lower, respectively, than its corresponding reference voltage, and sets said count control signal correlated with the reference voltage whose level is lower than said target value to a high or low level and supplies the set count control signal to said count means when the signal level of said sample hold signal output from said sample hold means is lower or higher, respectively, than its corresponding reference voltage, and wherein said count means, when there exists among the count control signals received from said comparison means, a count control signal which is correlated with the reference voltage whose level is higher than said target value and is set to a high level, counts down a bit of a predetermined order correlated in advance with the count control signal, and, when there exists among the count control signals received from said comparison means, a count control signal which is correlated with the reference voltage whose level is lower than said target value and is set to a high level, counts up a bit of a predetermined order correlated in advance with the count control signal.

7. The digital automatic power controller as set forth in claim 1, wherein said comparison means, centered around a predetermined target value of the signal level of said sample hold signal, sets a total of four or more of said reference voltages whose levels are different from each other, in which reference voltages whose levels are higher than the target value and reference voltages whose levels are lower than the target value are the same in number, generates the count control signal correlated with each of said reference voltages, sets said count control signal correlated with the reference voltage whose level is higher than said target value to a high or low level when the signal level of said sample hold signal output from said sample hold means is higher or lower, respectively, than its corresponding reference voltage, and sets said count control signal correlated with the reference voltage whose level is lower than said target value to a high or low level and supplies the set count control signal to said count means when the signal level of said sample hold signal output from said sample hold means is lower or higher, respectively, than its corresponding reference voltage, and wherein said count means, when there exists among the count control signals received from said comparison means, a count control signal which is correlated with the reference voltage whose level is higher than said target value and is set to a high level, counts down a bit of a predetermined order correlated in advance with the count control signal, and, when there exists among the count control signals received from said comparison means, a count control signal which is correlated with the reference voltage whose level is lower than said target value and is set to a high level, counts up a bit of a predetermined order correlated in advance with the count control signal.

8. A digital automatic power controller for feeding back information on an output light of a light source of an optical communication system to automatically control an intensity of the output light, comprising:

a light signal input device for receiving and photoelectrically converting the light signal output from said light source to output a photoelectric conversion signal;

a sample hold circuit for sampling and holding the photoelectric conversion signal output from said light signal input device to output a sample hold signal;

a comparator for comparing a signal level of the sample hold signal output from said sample hold circuit with four or more preset reference voltages to output a count control signal according to comparison results;

a counter circuit responsive to the count control signal output from said comparator for counting down or up a bit of a predetermined order to decrease or increase a count value;

a digital-to-analog conversion circuit for converting the count value output from said counter circuit into an analog signal; and light source drive circuit for supplying, to said light source, a driving current of said light source generated according to the level of said analog signal to control the intensity of the output light of said light source.

9. The digital automatic power controller as set forth in claim 8, wherein said reference voltages to be compared with the signal level of said sample hold signal at said comparator are set to be centered around a predetermined value, two of which having levels higher than the target value and two of which having levels lower than the target value, wherein said comparator generates four count control signals each correlated with each of said four reference voltages, and sets each of count control signal so as to indicate whether its corresponding reference voltage is higher or lower than the signal level of said sample hold signal output from said sample hold means and supplies said set count control signals to said counter circuit, and wherein said count means, when said count control signal correlated with the reference voltage of the higher level indicates that the signal level of said sample hold signal is higher than the reference voltage, counts down the second-lowest-order bit by one to reduce the count value by "2", when said count control signal correlated with the reference voltage of the highest level indicates that the signal level of said sample hold signal is lower than the reference voltage and said count control signal correlated with the reference voltage of the second highest level indicates that the signal level of said sample hold signal is higher than the reference voltage, counts down the lowest-order bit by one to decrease the count value by "1", when said count control signal correlated with the reference voltage of the lowest level indicates that the signal level of said sample hold signal is lower than the reference voltage, counts up the second-lowest order bit by one to increase the count value by "2", and when said count control signal correlated with the reference voltage of the lowest level indicates that the signal level of said sample hold signal is higher than the reference voltage and said count control signal correlated with a reference voltage of the second lowest level indicates that the signal level of said sample hold signal is lower than the reference voltage, counts up the lowest-order bit by one to increase the count value by "1".

10. The digital automatic power controller as set forth in claim 8, wherein said reference voltages to be compared with the signal level of said sample hold signal at said comparator are set to be centered around a predetermined target value, two of which having levels higher than the target value and two of which having levels lower than the target value, wherein said comparator generates four count control signals each correlated with each of said four reference voltages, sets two of said count control signals correlated with the two reference voltages whose levels are higher than said target value to a high or level when the signal level of said sample hold signal output from said sample hold means is higher or lower, respectively, than its corresponding reference voltage, and sets two of said count control signals correlated with the two reference voltages whose levels are lower than said target value to a high or low level when the signal level of said sample hold signal output from said sample hold means is lower or higher, respectively, than its corresponding reference voltage, and wherein said counter circuit, when said count control signal correlated with the reference voltage of the highest level is at a high level, counts down the second-lowest-order bit by one to decrease the count value by "2", when said count control signal correlated with the reference voltage of the highest level is at a low level and said count control signal correlated with the reference voltage of the second highest level is at a high level, counts down the lowest-order bit by one to decrease the count value by "1", when said count control signal correlated with the reference voltage of the lowest level is at a high level, counts up the second-lowest-order bit by one to increase the count value by "2", and when said count control signal correlated with the reference voltage of the lowest level is at a low level and said count control signal correlated with the reference voltage of the second lowest level is at a high level, counts up the lowest-order bit by one to increase the count value by "1".

11. A method of controlling an output light intensity of an optical communication system light source, comprising the steps of:

receiving a light signal output from the light source;

photoelectrically converting the light signal to output a photoelectric conversion signal;

sampling and holding the photoelectric conversion signal to output a sample hold signal;

comparing a signal level of the sample hold signal with four or more preset reference voltages to output a count control signal according to comparison results;

counting down or up a bit of a predetermined order to decrease or increase a digital count value;

converting the digital count value into an analog signal; and generating a driving current for the light source according to the level of the analog signal to control the intensity of the output light of the light source.

12. The method as set forth in claim 11, wherein two of the preset reference voltages are higher than the predetermined target value and two of the preset reference voltages are lower than the predetermined target value, and wherein the step of counting includes the substeps of:

decreasing the digital count value by 2 when the signal level of the sample hold signal is larger than the largest preset reference voltage, increasing the digital count value by 2 when the signal level of the sample hold signal is less than the smallest preset reference voltage, decreasing the digital count value by 1 when the signal level of the sample hold signal is between the first largest and second largest preset reference voltages, and increasing the digital count value by 1 when the signal level of the sample hold signal is between the first smallest and the second smallest preset reference voltages.

13. The method as set forth in claim 12, wherein the step of comparing includes the step of generating multiple count control signals according to the relative magnitude of the signal level of the sample hold signal with respect to the four preset reference voltages.

14. The method as set forth in claim 13, wherein the step of comparing includes the step of setting first and second control signals to a high level when the signal level of the sample hold signal is larger than the largest preset reference voltage.

15. The method as set forth in claim 14, wherein the step of comparing includes the step of setting the third and fourth count control signals to a high level when the signal level of the sample hold signal is less than the preset reference voltage.

16. The method as set forth in claim 13, wherein the step of comparing includes the step of setting none or only one of the count control signals to a high level when the signal level of the sample hold signal is between the largest preset reference voltage and the smallest preset reference voltage.

17. The method as set forth in claim 16, wherein none of the count control signals are set to a high level when the signal level of the sample hold signal is between the second largest preset reference voltage and the second smallest preset reference voltage.

18. The method as set forth in claim 16, wherein the step of counting includes the step of decreasing or increasing the digital count value by one when one of the four count control signals are at a high level.

19. The method as set forth in claim 13, wherein the step of counting includes the step of decreasing or increasing the digital count value by two when two of the count control signals are set at a high level.

20. The method as set forth in claim 13, wherein the digital count value is neither decreased nor increased when there are no count control signals which are set to a high level.

* * * * *